April 9, 1935. R. BURKLE 1,997,451

DISH BASKET

Filed March 18, 1933

INVENTOR
ROBERT BURKLE
BY
ATTORNEY

Patented Apr. 9, 1935

1,997,451

UNITED STATES PATENT OFFICE 1,997,451

DISH BASKET

Robert Burkle, North Bergen, N. J., assignor of one-half to Richard Merrifield, New York, N. Y.

Application March 18, 1933, Serial No. 661,554

4 Claims. (Cl. 141—9)

This invention relates to new and useful improvements in a dish basket.

This application relates to similar subject matter as my application for an automatic dish washing and drying machine filed in United States Patent Office on June 4, 1932, Serial No. 615,287.

This invention has for an object the construction of a dish basket which is adapted to be placed within an automatic dish washing and drying machine for the purpose of holding the dishes in an advantageous position so that they may be readily cleaned and dried by the operation of the machine.

Still further this invention contemplates the construction of the dish basket which is characterized by a basket formed of wire mesh and supporting a rack adapted to hold plates in a portion of the basket, and said rack and wire mesh being covered with rust proof material adapted to stand heat and shock.

Still further this invention contemplates a novel arrangement of handles upon the basket, which are constructed of heat insulation material so that the basket may be easily handled without discomfort to the hands.

Furthermore the invention contemplates covering the basket and rack with some phenol condensation products to constitute the rust proof material which is adapted to stand heat.

As another object of this invention it is proposed to provide an arrangement whereby the rack is removable from the basket.

As another object of this invention an arrangement is proposed whereby the rack may be slightly flexed out of normal shape so as to change the contact between the rack and dishes held thereby to insure proper cleaning of the dishes.

Still further the invention contemplates the construction of an article as mentioned which is simple and durable and which may be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Figure 1:
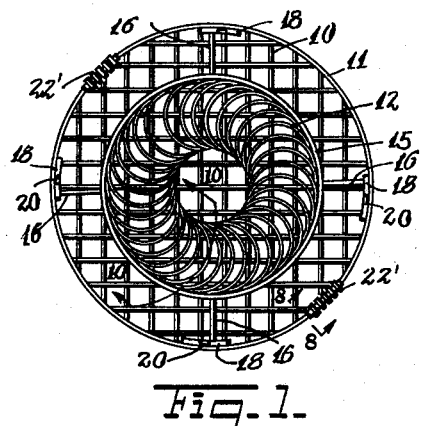
Fig. 1 is a plan view of a dish basket constructed according to this invention.
Figure 2:
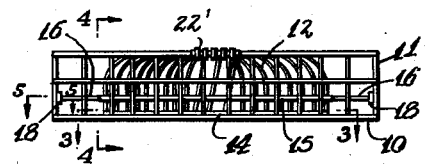
Fig. 2 is an elevational view of the basket shown in Fig. 1.

The dish basket according to this invention comprises a basket of wire mesh having a bottom portion 10 and sides 11. The basket is shown of circular shape. The wire mesh is covered with rust proof material adapted to stand heat and shock. It is necessary that the basket stand heat since heat is supplied within the drying machine to effect drying. Furthermore it is necessary that the basket be capable of withstanding shocks since housewives do not place dishes gently into the basket of dish washing machines.

A rack 12 is mounted within the basket and is adapted to support plates or similar objects in the dish basket. This rack is also made from rust proof material adapted to stand heat and shock. Preferably the rust proof material called for in this specification may be metallic wire covered with some phenol condensation product. The rack 12 is shown arranged in the form of an annular member and is located at the center of the basket. An arrangement is provided whereby the rack is removable as hereinafter further described.

The rack 12 comprises a pair of concentric circular wires 13 and 14 spaced from each other and a plurality of inverted U-shaped members between the wires. Each of the U-shaped members has its lower ends pivotally attached at 13' and at 14' respectively to one and the other of the circular members 13 and 14. A ring 15 is arranged around the rack 12 and is attached upon the side of the rack slightly above the bottom. The ring 15 is attached preferably by rivets 15' on each of the members. The arrangement is such that the ring 15 may be forcefully slightly rotated to flex the members into various positions. For example, in Fig. 4 this has been illustrated. The ring 15 is shown forced into a different position indicated by the dot and dash lines so that the members, only two parts being shown, are forced into different positions. This arrangement is important in that in this manner the points of contact between the rack and the dishes are changed, which allows cleaning the dishes over their entire areas.

Figure 4:
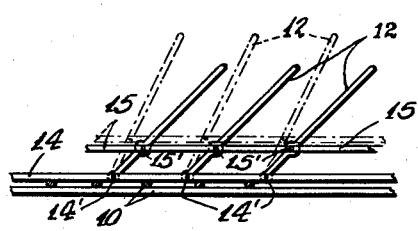
Fig. 4 is a fragmentary elevational view looking in the direction of the line 4—4 of Fig. 2.

A means is provided for releasably holding the rack in place and furthermore for holding the rack in one or another position so as to force the deformation described relative to Fig. 4. This means comprises a plurality of arms 16 radially projecting from the ring 15. Each of the arms 16 has a head 17 at its free end. These heads engage within brackets 18 attached upon the inner sides of the basket. Each of the brackets 18 is provided with an opening 19 extending substantially the entire length of the bracket and in connection with an exit branch opening 20 arranged intermediate the ends of the bracket. A spring 21 is secured within the bracket 18 and is arranged so as to hold the head 17 at one end or the other end of the bracket according to which position it is forced into.

Figure 3:
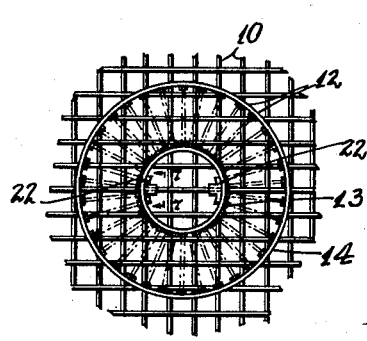
Fig. 3 is a fragmentary horizontal sectional view taken on the line 3—3 of Fig. 2.
Figure 7:
Fig. 7 is a sectional view taken on the line 7—7 of Fig. 3.
Figure 10:
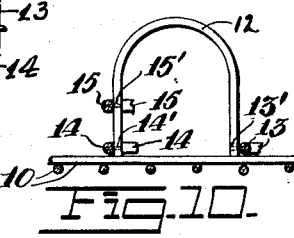
Fig. 10 is a fragmentary enlarged sectional view taken on the line 10—10 of Fig. 1 and showing in particular the details of one of the inverted U-shaped members.
Figure 7:
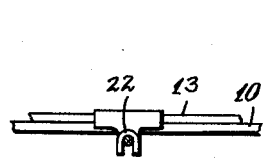
Figure 6:
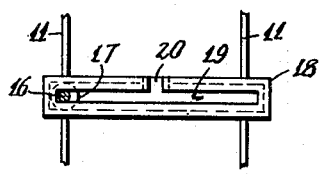
Fig. 6 is a sectional view taken on the line 6—6 of Fig. 5.
Figure 5:
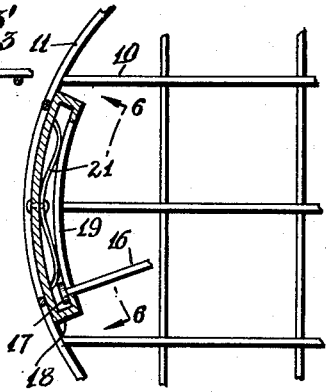
Fig. 5 is a fragmentary horizontal sectional view taken on the line 5—5 of Fig. 2.
Figure 9:
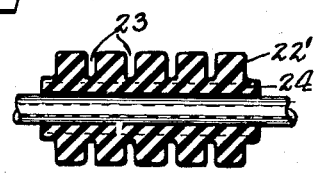
Fig. 9 is a longitudinal sectional view taken on the line 9—9 of Fig. 8.
Figure 8:
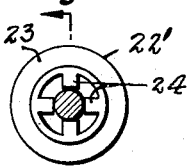
Fig. 8 is a sectional view taken on the line 8—8 of Fig. 1.

An arrangement is provided for holding the base of the rack against turning when the radial arms 16 are forced into their different positions. This means comprises clips 22 attached upon one of the base rings (13 or 14) of the rack and engaging one of the wires forming the bottom 10 of the basket. This arrangement is very clearly illustrated in Figs. 3 and 7. The function of the clips 22 is to attach the base of the rack in fixed relation with the basket. It is then possible to flex the inverted U-shaped members into different shapes as hereinafter further described. A pair of heat insulation handles 22' are attached upon the basket at diametrically opposite points to facilitate handling of the basket.

Handle 22' is secured on one of the wires of the side 11 of the wire mesh which forms the basket and is formed with annular grooves 23 and longitudinal inner ribs 24 to allow rapid radiation of heat.

The use of the basket is described in detail in the drawing and specification of the application previously identified at the beginning of this specification. Cups, glasses, silver ware, etc. may be placed within the dish basket around the rack and also within the center of the rack. The plates may be stood up between the members of the rack. Then the entire dish basket placed within the dish washing and drying machine. If the dishes are not very soiled, for example, when foods which do not stick very hard have been used, then it is merely necessary that the dish basket maintain its position within the washing machine for the required time during which the machine operates to wash and dry the dishes. In the event that heavy fats, or sugar were used during the meal then it may be necessary that during the operation of the washing machine it be momentarily stopped or after one complete operation of the machine, prior to a subsequent operation upon the same dishes, that the radial arms be forcibly moved so that the heads 17 are moved to the other ends of the brackets 18. This change will distort the members of the rack so that the contact between the members and dishes is at different areas. Then the new uncovered areas will now be exposed to the action of the washing machine.

If it is desired to remove the rack it is necessary that the radial arms 16 be rotated so that the arms are at positions intermediate the ends of the brackets and then the rack may be lifted with the arms 16 passing through the openings 20. It should be noticed that a change in the position of the arms 16 from one of the ends of the brackets 18 to the other end does not cause turning of the rack since the clips 22 prevent such turning. Consequently the change of position of the upper portion of the rack will directly cause distortion of the members of the rack as described regarding the dot and dash lines in Fig. 4.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. A dish basket, comprising a basket of wire mesh having a bottom and sides, a rack of inverted spaced U-shaped members in ring form within and resting upon the bottom of said basket, clips upon said rack for engaging the bottom of the basket to prevent rotation of the rack on the center of said ring form, a ring attached upon the outer sides of each of the inverted U-shaped members of the rack, several arms projecting outwardly from said ring, and means for releasably holding the outer extremities of said arms in several positions on said basket whereby the U-shaped members may be held in various flexed positions.

2. A dish basket, comprising a basket of wire mesh having a bottom and sides, a rack of inverted spaced U-shaped members in ring form within and resting upon the bottom of said basket, clips upon said rack for engaging the bottom of the basket to prevent rotation, a ring attached upon the outer sides of each of the inverted U-shaped members of the rack, several arms projecting outwardly from said ring, and means for releasably holding the outer extremities of said arms on said basket whereby the U-shaped members may be held in various flexed positions, comprising brackets attached upon the sides of said basket and having longitudinal slots connected with an exit branch, and said arms being provided with heads at the extremities engaging into said bracket through said longitudinal slots.

3. A dish basket, comprising a basket of wire mesh having a bottom and sides, a rack of inverted spaced U-shaped members in ring form within and resting upon the bottom of said basket, clips upon said rack for engaging the bottom of the basket to prevent rotation, a ring attached upon the outer sides of each of the inverted U-shaped members of the rack, several arms projecting outwardly from said ring, and means for releasably holding the outer extremities of said arms on said basket whereby the U-shaped members may be held in various flexed positions, said rack comprising a base portion consisting of a pair of concentric rings, and said U-shaped inverted members extending between said rings.

4. A dish basket, comprising a basket of wire mesh having a bottom and sides, a rack of inverted spaced U-shaped members in ring form within and resting upon the bottom of said basket, clips upon said rack for engaging the bottom of the basket to prevent rotation, a ring attached upon the outer sides of each of the inverted U-shaped members of the rack, several arms projecting outwardly from said ring, and means for releasably holding the outer extremities of said arms on said basket whereby the U-shaped members may be held in various flexed positions, said ring being located slightly above the bases of the U-shaped members of said rack.

ROBERT BURKLE.